(12) United States Patent
Kang

(10) Patent No.: US 7,886,131 B1
(45) Date of Patent: Feb. 8, 2011

(54) MULTITHREAD PROCESSOR WITH THREAD BASED THROTTLING

(75) Inventor: Jack Kang, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 328 days.

(21) Appl. No.: 11/833,127

(22) Filed: Aug. 2, 2007

Related U.S. Application Data

(60) Provisional application No. 60/822,333, filed on Aug. 14, 2006.

(51) Int. Cl.
*G06F 15/80* (2006.01)
*G06F 9/00* (2006.01)

(52) U.S. Cl. ............... 712/220; 712/41; 713/300

(58) Field of Classification Search ........... 712/42, 712/43, 220, 221, 229; 713/300, 320, 322, 713/323
See application file for complete search history.

(56) References Cited

U.S. PATENT DOCUMENTS

| | | | | |
|---|---|---|---|---|
| 5,692,201 A * | 11/1997 | Yato | ............... | 713/322 |
| 7,111,179 B1 * | 9/2006 | Girson et al. | ............... | 713/300 |
| 7,206,949 B2 * | 4/2007 | Kuranuki | ............... | 713/320 |
| 7,523,330 B2 * | 4/2009 | Golla et al. | ............... | 713/322 |
| 7,536,534 B2 * | 5/2009 | Nakajima | ............... | 712/209 |
| 7,581,128 B2 * | 8/2009 | Yamada et al. | ............... | 713/323 |
| 2003/0135779 A1 * | 7/2003 | Takashima et al. | ............ | 713/600 |
| 2003/0184271 A1 * | 10/2003 | Aisaka et al. | ............... | 323/283 |
| 2004/0193929 A1 * | 9/2004 | Kuranuki | ............... | 713/322 |
| 2004/0260960 A1 * | 12/2004 | Hilgendorf et al. | .......... | 713/320 |
| 2005/0289365 A1 * | 12/2005 | Bhandarkar | ............... | 713/300 |
| 2006/0005051 A1 * | 1/2006 | Golla et al. | ............... | 713/300 |
| 2006/0294520 A1 * | 12/2006 | Anderson | ............... | 718/100 |
| 2007/0006007 A1 * | 1/2007 | Woodbridge et al. | ........ | 713/322 |

FOREIGN PATENT DOCUMENTS

EP            1460519 A2 *    9/2004

* cited by examiner

*Primary Examiner*—Aimee J Li

(57) ABSTRACT

A multithreaded processor with dynamic thread based throttling, more specifically, based at least in part on the aggregated execution bandwidth requests of the threads, is disclosed herein. In various embodiments, the multithreaded processor may throttle by scaling clock frequency and/or voltage provided to the processor, based at least in part on the aggregated execution bandwidth requests of the threads. The aggregation and scaling may be performed when a bandwidth allocation request of an instruction execution thread is modified or when a computation intensive instruction execution thread is activated or re-activated. Other embodiments and/or features may also be described and claimed.

27 Claims, 4 Drawing Sheets

| | IF | ID | IS | EX | MEM | WB | |
|---|---|---|---|---|---|---|---|
| Cycle 1 | T0 | T? | T? | T? | T? | T? | |
| Cycle 2 | T1 | T0 | T? | T? | T? | T? | |
| Cycle 3 | T2 | T1 | T0 | T? | T? | T? | |
| Cycle 4 | T0 | T2 | T1 | T0 | T? | T? | |
| Cycle 5 | T1 | T0 | T2 | T1 | T0 | T? | |
| Cycle 6 | T0 | T1 | T0 | T2 | T1 | T0 | |
| Cycle 7 | T1 | T1 | T1 | T0 | T2 | T1 | |
| Cycle 8 | T0 | T1 | T0 | T1 | T0 | T2 | |
| | 310 | 320 | 330 | 340 | 350 | 360 | 300 |

*Fig. 3*

MULTITHREAD PROCESSOR WITH THREAD BASED THROTTLING

CROSS-REFERENCES TO RELATED APPLICATIONS

This application is a non-provisional application of provisional application 60/822,333, filed Aug. 14, 2006, entitled "Power Saving Features Proposal," the contents of which are hereby incorporated by reference in their entirety for all purposes, and claims priority to the 60/822,333 provisional application.

TECHNICAL FIELD

Embodiments of the present invention relate to the field of data processing, in particular, to a multithread processor with thread based throttling capability.

BACKGROUND

Advances in integrated circuit technology have led to continuing improvement in processor functionality and features. Often power consumption increases correspondingly with the increased processor functionality and features. Increasingly, processors may be employed in applications, such as mobile computing, where reduced power consumption is desired, e.g. to extend battery life. Further, it is desirable for the processor to be able to dynamically throttle to either provide more execution bandwidth or reduce power consumption, depending on the workload at a particular moment in time.

SUMMARY

A multithreaded processor with dynamic thread based throttling, more specifically, based at least in part on the aggregated execution bandwidth requests of the threads, is disclosed herein. In various embodiments, the multithreaded processor may throttle by scaling clock frequency and/or voltage provided to the processor, based at least in part on the aggregated execution bandwidth requests of the threads. The aggregation and scaling may be performed when a bandwidth allocation request of an instruction execution thread is modified or when a computation intensive instruction execution thread is activated or re-activated. Other embodiments and/or features are also described and claimed.

In accordance with one embodiment of the invention, a method including aggregating execution bandwidth allocation requests of a plurality of instruction execution threads to be executed on a processor. The method also includes altering one or more operating characteristics of the processor to throttle the processor, enabling the processor to either provide more execution bandwidth or reduce power consumption, the altering being based at least in part on the aggregated execution bandwidth allocation requested.

In accordance with another mode of one embodiment of the invention, each execution bandwidth allocation request is expressed in terms of a percentage of the processor's processing power at full throttle.

In accordance with another mode of one embodiment of the invention, each execution bandwidth allocation request is expressed in terms of absolute processing power.

In accordance with a further mode of one embodiment of the invention, the altering includes scaling at least a selected one of clock frequency of a clock signal or voltage supplied to the processor to operate the processor to execute the instruction execution threads. In accordance with an added mode of one embodiment of the invention, the altering includes scaling both clock frequency of a clock signal and voltage supplied to the processor to operate the processor to execute the instruction execution threads. In accordance with an additional mode of one embodiment of the invention, the scaling is based at least in part on the result of the aggregating. In accordance with yet another mode of one embodiment of the invention, the aggregating and scaling are performed substantially in real time, after the execution bandwidth allocation request of at least one of the instruction execution threads has been modified, and the method further comprises modifying the execution bandwidth allocation request of the at least one instruction execution thread. In accordance with yet a further mode of one embodiment of the invention, the modifying is performed in response to a change in a volume of data to be processed by the at least one instruction execution thread. In accordance with yet an added mode of one embodiment of the invention, the modifying is performed in response to an interrupt, and the at least one instruction execution thread comprises a handler of the interrupt. In accordance with another mode of one embodiment of the invention, wherein the modifying is performed in response to an external event. In accordance with yet an additional mode of one embodiment of the invention, the plurality of instruction execution threads comprise a newly activated or re-activated instruction execution thread, and the aggregating and scaling are performed substantially in real time, after the instruction execution thread is activated or re-activated. In accordance with again another mode of one embodiment of the invention, the newly activated or re-activated execution thread is configured to perform intensive computations.

With the features of one embodiment of the invention in view, there is also provided a multi-thread processor including an execution block to execute a plurality of instruction execution threads, a clock, a voltage supply, a regulator, and a scheduler. In one embodiment the clock is coupled to the execution block to supply a clock signal to the execution block. In one embodiment the voltage supply is coupled to the execution block to supply a voltage to the execution block. In one embodiment the regulator is coupled to at least a selected one of the clock or the voltage supply block to scale at least a selected one of clock frequency of the clock signal or the voltage supplied to the execution block to operate the execution block to execute instruction. In one embodiment the scheduler is coupled to the regulator and configured to configure the regulator to perform the scaling based at least in part on aggregated bandwidth allocation requests of the instruction execution threads. In one embodiment, the execution block includes at least one execution means, such as a processing core co-disposed in an integrated circuit package with at least one of the clock, the voltage supply, the regulator, and the scheduler.

In accordance with another feature of one embodiment of the invention, at least one of the execution bandwidth allocation requests is expressed relatively in terms of a percentage of the processor's processing power at full throttle.

In accordance with another feature of one embodiment of the invention, at least one of the execution bandwidth allocation requests is expressed in terms of absolute processing power.

In accordance with a further feature of one embodiment of the invention, both the clock and the regulator are coupled to the voltage supply, with the clock coupled to the regulator through the voltage supply, and the regulator is configured to scale both the clock frequency of the clock signal and the voltage supplied to the execution block to operate the execution block to execute the instruction execution threads.

In accordance with an added feature of one embodiment of the invention, at least the processor and the regulator are co-located on an integrated circuit.

In accordance with an additional feature of one embodiment of the invention, the scheduler is further configured to aggregate execution bandwidth allocation requests of the instruction execution threads. In accordance with yet another feature of one embodiment of the invention, the scheduler is configured to perform the aggregating and configuring of the regulator block substantially in real time, after receiving a modification to the execution bandwidth allocation request of at least one of the instruction execution threads. In accordance with yet a further feature of one embodiment of the invention, the modification is received by the scheduler in response to a change in a volume of data to be processed by at least one of the instruction execution threads. In accordance with yet an added feature of one embodiment of the invention, the modification is received in response to an interrupt, and the at least one instruction execution thread includes a handler of the interrupt. In accordance with another feature of one embodiment of the invention, the modifying is performed in response to an external event. In accordance with yet an additional feature of one embodiment of the invention, the apparatus is a storage system.

In accordance with again another feature of one embodiment of the invention, the plurality of instruction execution threads include a newly activated or re-activated instruction execution thread, and the controller is configured to perform the aggregating and configuring substantially in real time, after the instruction execution thread is activated or re-activated. In accordance with again a further feature of one embodiment of the invention, the newly activated or re-activated execution thread is configured to perform intensive computations. In accordance with again an added feature of one embodiment of the invention, the apparatus is a wireless communication device.

BRIEF DESCRIPTION OF THE DRAWINGS

The present invention will be described by way of exemplary embodiments, but not limitations, illustrated in the accompanying drawings in which like references denote similar elements, and in which:

FIG. 3 illustrates an example of interleaved instruction dispatching and execution for multiple instruction execution threads.

DETAILED DESCRIPTION

In the following detailed description, reference is made to the accompanying drawings which form a part hereof wherein like numerals designate like parts throughout, and in which are shown, by way of illustration, specific embodiments in which the invention may be practiced. It is to be understood that other embodiments may be utilized and structural or logical changes may be made without departing from the scope of the present invention. Therefore, the following detailed description is not to be taken in a limiting sense, and the scope of the present invention is defined by the appended claims and their equivalents.

"Circuitry," as used in any embodiment herein, may comprise, for example, singly or in any combination, hardwired circuitry, programmable circuitry, state machine circuitry, and/or firmware that stores instructions executed by programmable circuitry.

Reference in the specification to "one embodiment" or "an embodiment" means that a particular feature, structure, or characteristic described in connection with the embodiment is included in at least one embodiment. The appearances of the phrase "in one embodiment" in various places in the specification do not necessarily all refer to the same embodiment, but it may. The phrase "NB" means "A or B". The phrase "A and/or B" means "(A), (B), or (A and B)". The phrase "at least one of A, B, and C" means "(A), (B), (C), (A and B), (A and C), (B and C) or (A, B and C)". The phrase "(A) B" means "(A B) or (B)", that is "A" is optional.

Figure 1:
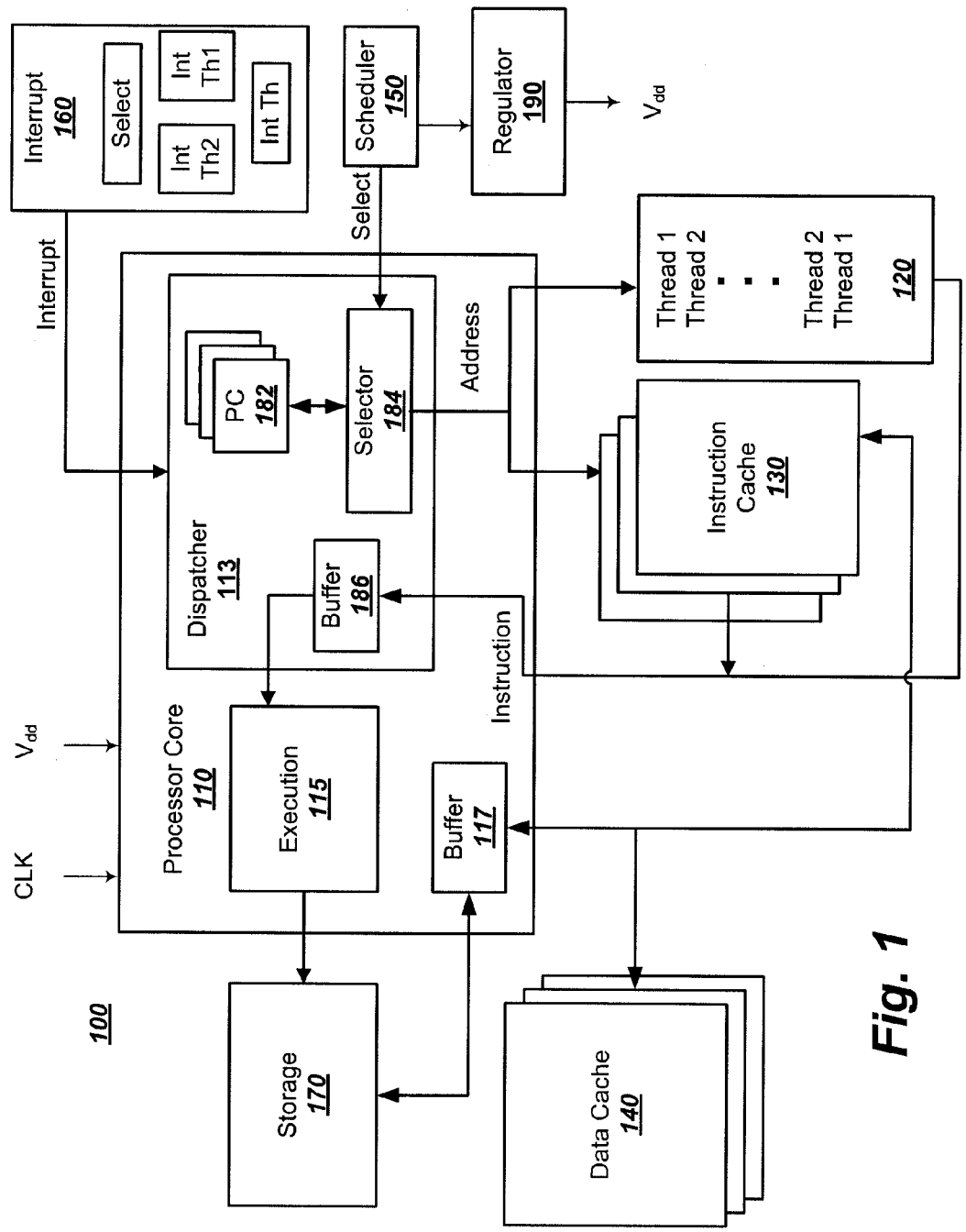
FIG. 1 illustrates a multithread processor incorporated with the throttling teachings of the invention, in accordance with various embodiments.

Referring now to FIG. 1, a multithread processor incorporated with the thread based throttling teaching of the invention, in accordance with various embodiments, is shown. As will be described in more detail, multithread processor 100 is endowed with the capability to throttle, i.e. either provide processor 100 with more execution bandwidth or reduce power consumption, based at least in part on the aggregated, i.e., the combined or total, execution bandwidth requests of various instruction execution threads (hereinafter, simply "threads") to be executed by processor 100.

For the illustrated embodiments, multithread processor 100 is endowed with the capability to scale the clock frequency of a clock signal (CLK) and voltage ($V_{dd}$) supplied to processor 100 based at least in part on the aggregated execution bandwidth requests of the various threads to be executed. More specifically, multithread processor 100 is endowed with scheduler 150 and regulator 190 equipped with the teachings of the invention, to cooperatively scale CLK and $V_{dd}$ based at least in part on the aggregated execution bandwidth requests of the various threads to be executed. For the embodiments, scheduler 150 and regulator 190 cooperate to scale CLK and scale of Vdd.

Figure 2:
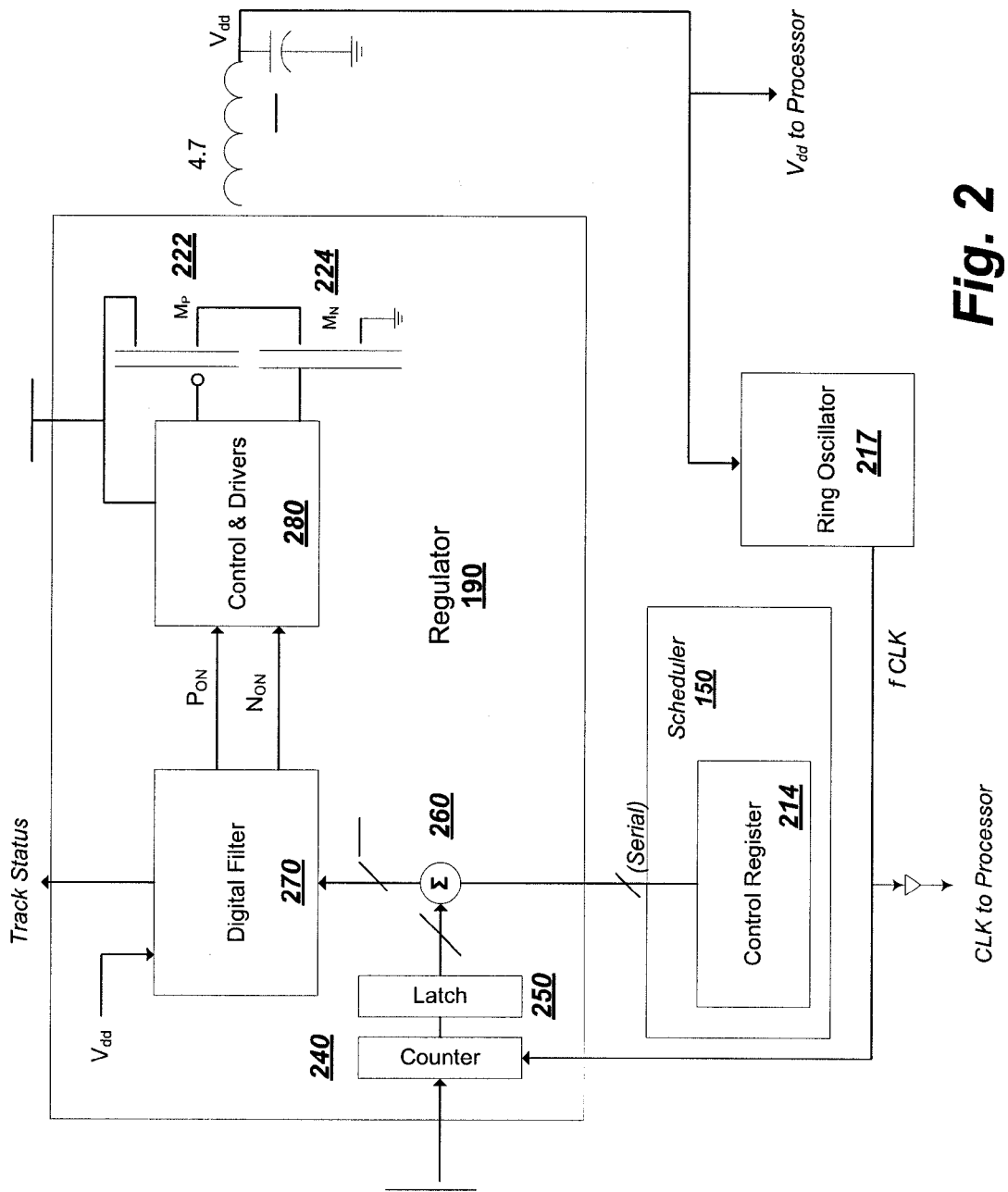
FIG. 2 illustrates a regulation arrangement suitable for practicing the invention, in accordance with various embodiments.

Referring now briefly to FIG. 2, wherein one implementation of regulator 190 is illustrated. For the implementation, scheduler 150 includes in particular, control register 214 to store any operation values needed to control regulator 190, to effectuate the desired scaling of CLK and Vdd. The implementation of regulator 190 will be further described later referencing FIG. 2.

Referring back to FIG. 1, in alternate embodiments, scheduler 150 and regulator 190 may scale CLK directly, or scale only either CLK or Vdd, and not both. In still other embodiments, other arrangements may be employed to scale CLK and/or Vdd. These variations are all within the contemplation of the present invention, and the ability of those ordinary skilled in the art to implement based on the teachings disclosed herein.

Continuing to refer to FIG. 1, in addition to scheduler 150 and regulator 190, processor 100 further includes processing core 110 with an instruction dispatcher 113 (hereinafter, simply "dispatcher"), an execution block 115, and a buffer 117, coupled to each other as shown. For the embodiments, processor 100 is further illustrated as having various associated devices, coupled to the processing core 110. These devices include tightly coupled memory 120, an instruction cache 130, a data cache 140, an interrupt handler 160, and storage 170.

Execution block 115 is equipped to execute instructions of various threads. In various embodiments, it may include one or more Arithmetic Logic Units (ALU) and/or multiplication circuitry, adapted to support integer and/or floating point operations.

In various embodiments, dispatcher 113 includes native support for interleaving fetching and issuing of instructions for a number of threads. For the embodiments, dispatcher 113 includes in particular, multiple program counters (PC) 182 (one for each concurrently executed thread), selector 184, and buffer 186, coupled to each other and the earlier described elements as shown. Interleaving fetching and issuance of instructions from multiple currently executed threads is the subject matter of co-pending U.S. patent application Ser. No. 11/775,152, entitled "A Multi-Thread Processor with Multiple Program Counters", filed Jul. 9, 2007, the contents of which are hereby incorporated in their entirety for all purposes. In alternate embodiments, the present invention may be practiced with other dispatchers.

Scheduler 150, in addition to the earlier described capability to configure regulator 190, it is also endowed to perform its conventional function of scheduling instruction dispatching. In various embodiments, it is endowed to be able to perform fine grain scheduling of interleaved instruction dispatching for multiple concurrent threads. "Fine grain scheduling of interleaved instruction dispatching for multiple concurrent threads" is the subject matter of co-pending U.S. patent application Ser. No. 11/833,099, now published as US Publication Number 2008/0040724, entitled "Instruction Dispatching Method And Apparatus", contemporaneously filed, the contents of which are hereby incorporated in their entirety for all purposes. In alternate embodiments, the present invention may be practiced with other schedulers.

In various embodiments, the tightly coupled memory 120 is a smaller, faster memory than storage 170 and is generally configured to store a subset of instructions for at least one thread. As shown in FIG. 1, the tightly coupled memory 120 may be shared, in various embodiments, by the multiple threads, with or without partitioning for the various threads.

In various embodiments, the tightly coupled memory 120 may functionally operate as an L1 cache by providing faster response time than the instruction cache 130 or storage 170. Accordingly, when a requested thread address is found in the tightly coupled memory 120, the instruction associated with the address may not need to be retrieved from the instruction cache 130 or storage 170. In one embodiment, a tightly coupled memory 120 is configured to store at least a first and a second corresponding subset of instructions of first and second instruction threads.

An instruction cache 130 may store additional instructions associated with a thread. In a multithread environment, one embodiment dynamically allocates a portion of the instruction cache to each thread. Accordingly, in one embodiment the instruction cache 130 is configured to store at least a first and a second corresponding subset of instructions of the first and second instruction threads. In one embodiment, using an embedded processor, the instruction cache 130 is coupled to the tightly coupled memory 120 and may operate as an L2 cache. In an alternative embodiment, the tightly coupled memory 120 is merely a subset of the instruction cache 130 and the data cache 140.

Similarly, the data cache 140 may store data associated with a thread. In various embodiments, the instruction cache 130 and data cache 140 may be dynamically allocated. Moreover, in contrast to the illustrated configuration, one embodiment enables the instruction cache 130 and data cache 140 to be co-located in the same cache.

In one embodiment, upon determining that a cache miss has occurred for either the instruction cache 130 or the data cache 140, the processing core 110 is configured to allow a second thread to use the processing core 110 while a first thread waits for data to be retrieved from a remote memory location, such as storage 170.

In various embodiments, the processor 100 includes interrupt circuitry 160 to interrupt dispatcher 113. These interrupts may be initiated on behalf of an instruction execution thread associated with an application and/or an operating system.

The interrupt circuitry 160, in one embodiment, delivers interrupts associated with a specific instruction execution thread. Accordingly, in one embodiment, the dispatcher 113 is adapted to immediately switch to fetch and issue instructions for the first instruction execution thread upon receipt of an interrupt for the first instruction execution thread while fetching and issuing instructions for an instruction execution thread other than the first instruction execution thread. In accordance with at least one embodiment, the dispatcher 113 is adapted to fetch and issue at least one instruction for a first instruction execution thread to determine where the thread before processing a received interrupt for the first instruction execution thread.

In accordance with one embodiment, the dispatcher 113 only processes an interrupt for a selected instruction execution thread while fetching and issuing instructions for that selected instruction execution thread. If a received interrupt is for an unselected instruction execution thread, dispatcher 113 may either ignore the received interrupt or queues the received interrupt into a buffer 117 for later processing upon switching to the appropriate thread.

Interrupts as discussed may refer to traditional central processing unit (CPU) interrupts. Those skilled in the art will understand that external events such as new or additional signals may also be handled as interrupts as described herein and that external events as generally defined may also include interrupts.

Storage 170 may include semiconductor firmware memory, programmable memory, non-volatile memory, read only memory (ROM), electrically programmable memory, random access memory (RAM), flash memory (which may include, for example, NAND or NOR type memory structures), magnetic disk memory, and/or optical disk memory. Either additionally or alternatively, memory 170 may comprise other and/or later-developed types of computer-readable memory including electrical, optical, acoustical or other form of propagated signals (e.g., carrier waves, infrared signals, digital signals). Machine-readable firmware program instructions may be stored in memory 170. In one embodiment, the storage 170 includes any storage medium or machine-accessible medium and/or any storage mechanism that provides (i.e., stores and/or transmits) information in a form readable by a machine (e.g., a computer).

Referring now to FIG. 2 again, illustrated therein is an implementation of regulator 190, along with Vdd, clock 217 (also referred to as ring oscillator), and a partial view of scheduler 150, coupled to each other as shown. For the embodiment, regulator 190 includes field effect transistors (FET) 222 and 224, control and drivers 280, digital filter 270, summer 260, latch 250, and counter 240 coupled to each other as shown. Elements 222, 224, 240, 250, 260 and 270 perform their conventional functions of switching, driving, filtering, summation, latching, holding a count value, and so forth. Thus, through the programming of register 214, scheduler 150 may configure regulator 190 to lower Vdd as the speed of ring oscillator 217 is decreased to a desired clock frequency for clock signal CLK provided to processor 100. Likewise, scheduler 150 may configure regulator 190 to raise Vdd as the speed of ring oscillator 217 is increased to a desired clock frequency for clock signal CLK provided to processor 100. Resultantly, a continuous range of voltages and clock frequencies may be obtained. Therefore, scheduler 150 and regulator 190 may cooperate to scale up Vdd and the clock frequency to provide more execution bandwidth to processing core 110 or scale down Vdd and the clock frequency to reduce power consumed by processing core 110 as desired. As an example, a feedback mechanism may be employed to help control the level of Vdd. As clock speed decreases, the feedback mechanism knows that Vdd decreases. However, if Vdd decreases too much, the multithread processor 100 will not operate at full capacity and therefore, the feedback mechanism monitors Vdd relative to the clock frequency.

FIG. 3 illustrates an example of interleaved instruction dispatching and execution for multiple concurrently executed instruction threads. The example assumes a six stage pipeline having an instruction fetch (IF) stage 310, an instruction decode (ID) stage 320, an instruction dispatch (IS) stage 330, an execution (EX) stage 340, a memory access (MEM) stage 350 and a write back (WB) stage 360, and an instruction thread execution period having eight clock cycles (Cycle 1-Cycle 8). The example further assumes three concurrently executed threads (T0-T2) with different execution bandwidth requirements, more specifically, T0 having the largest execution bandwidth requirement, followed by T1, and T2.

It can be seen from the illustration, for this example, instructions were interleavingly dispatched for the three threads (T0-T2). Instructions of T0, having the biggest execution bandwidth requirement, are fetched and dispatched four out of the eight clock cycles, whereas instructions of T1 and T2 having successively lower execution bandwidth requirements are dispatched three times and once respectively, during the eight clock cycle instruction thread execution period. The fetching and dispatching patterns continues until execution of at least one of the threads is completed or the execution bandwidth requirement of one of the threads changes.

Figure 4:
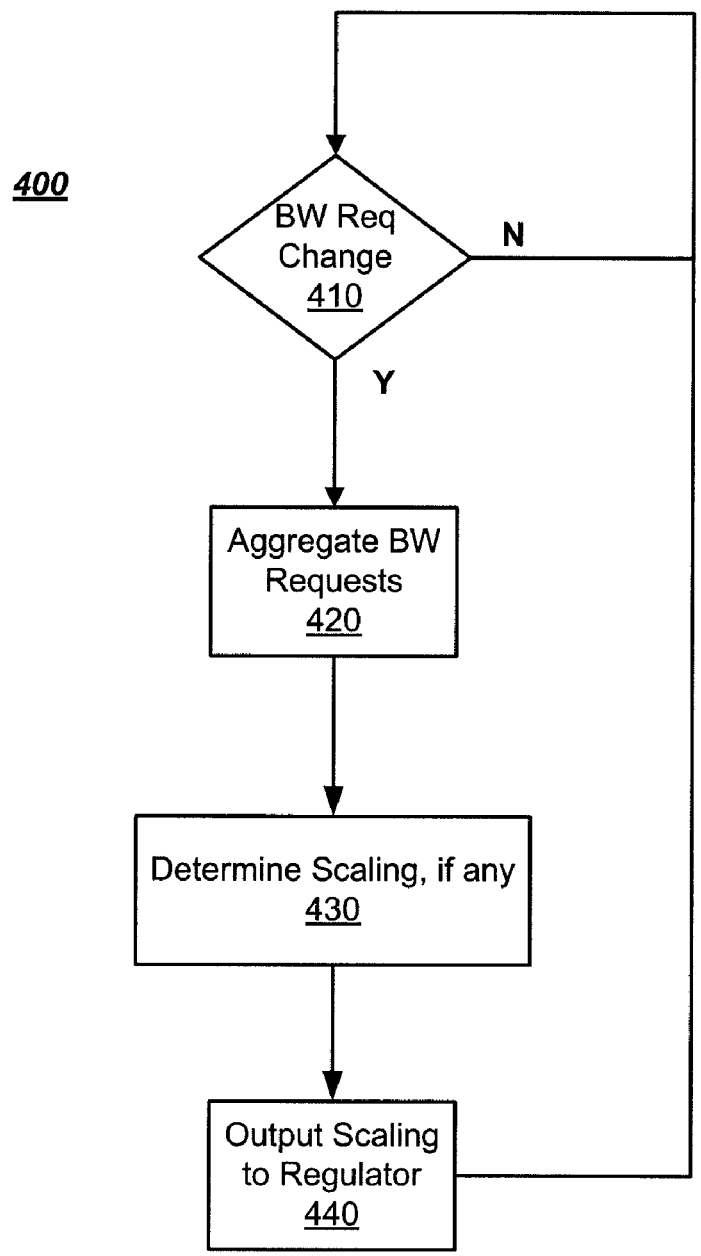
FIG. 4 illustrates a method of the invention, in accordance with various embodiments.

FIG. 4 illustrates a method of the invention, in accordance with various embodiments. As illustrated, at 410, scheduler 150 determines whether there is any change in execution bandwidth requirement. A change in execution bandwidth requirement may be resulted from the reporting of an interrupt; that is the thread having the interrupt handler is to be now given more execution bandwidth. An example of this type of change is the triggering of the servo interrupt to be handled by the servo interrupt handler in a storage system. The servo interrupt handler normally requires a very small execution bandwidth while it is in an idle state, but a large execution bandwidth requirement when it is processing an interrupt.

Another change in execution bandwidth requirement may also be resulted from the activation or re-activation of a computational intensive thread. An example of this type of change is the decoding thread of a media player being invoked to decode a stream of media, in particular, in the case of a wireless mobile communication device. The decoding thread is normally idle and requires very little execution bandwidth, except when it is activated or re-activated to performing decoding.

The above examples are of course just a couple of illustrative examples. Change in execution bandwidth requirements may also occur under a variety of other circumstances.

In various embodiments, the execution bandwidth requirements or requests are expressed relatively, in terms of a percentage of a processor's execution power at full throttle, e.g. 1 representing 100%, 0.5 representing 50% and so forth. The relationship between the execution bandwidth requirements and changes in Vdd and clock speed is dependent upon operating conditions and operational characteristics of an apparatus, such as, for example, an integrated circuit, hosting processor 100. Thus, one skilled in the art, in accordance with the present invention, will characterize operation of the apparatus hosting processor 100 in order to determine the relationship between the execution bandwidth requirements and changes in Vdd and clock speed. This accounts for operational characteristic differences between various apparatuses, as well as for changes and advances in various apparatuses. Those skilled in the art will understand that other arrangements for indicating bandwidth requirements or requests are also possible. For example, they may be expressed with respect to absolute processing power, such as, for example, Dhrystone instructions executed per second (DMIPS), Dhrystone number, or some other benchmark number.

In various embodiments, the execution bandwidth requirements of the various threads under various circumstances may be dynamically provided to scheduler 150 by the threads themselves, or by other entities, or pre-provided to scheduler 150. Pre-programmed levels within register 214 may be employed to correlate Vdd, the clock frequency and the execution bandwidth requirements. Additionally, a feedback mechanism may be employed to correlate Vdd, the clock frequency and the execution bandwidth requirements and to monitor appropriate levels for Vdd.

Still referring to FIG. 4, for the embodiments, on detection or receipt of a change in execution bandwidth requirement for a thread, scheduler 150 proceeds to aggregate the execution bandwidth requests 420. On aggregation, scheduler 150 determines 430 whether the configuration of regulator 190 should be altered to throttle processor 100. For the earlier described embodiments, scheduler 150 determines whether the configuration of regulator 190 should be altered to scale up or down the clock frequency and the voltage supplied to execution block 115. Thereafter, scheduler 150 configures 440 regulator 190 accordingly.

In various embodiments, if processor 100 is operating at full throttle, and the aggregated bandwidth requirement is less than the processor's execution bandwidth at full throttle, scheduler 150 configures regulator 190 to scale back the clock frequency and voltage provided to execution block 115. On the other hand, if processor 100 has been throttled back, and the aggregated bandwidth requirement has increased, equals to or exceeds the processor's execution bandwidth at full throttle, scheduler 150 configures regulator 190 to scale up the clock frequency and voltage provided to execution block 115.

Thus, a multithreaded processor capable of dynamically throttle itself based on execution requirements of the various threads has been described. Although specific embodiments have been illustrated and described herein, it will be appreciated by those of ordinary skill in the art and others, that a wide variety of alternate and/or equivalent implementations may be substituted for the specific embodiment shown in the described without departing from the scope of the present invention. This application is intended to cover any adaptations or variations of the embodiment discussed herein. Therefore, it is manifested and intended that the invention be limited only by the claims and the equivalents thereof.

What is claimed is:

1. A method comprising:
receiving, for each of a plurality of instruction execution threads to be executed on a processor, a corresponding execution bandwidth allocation request that is associated with an execution bandwidth allocation requested by the corresponding instruction execution thread;
aggregating execution bandwidth allocation requests of the plurality of instruction execution threads; and
altering one or more operating characteristics of the processor to throttle the processor, enabling the processor to either provide more execution bandwidth or reduce power consumption, the altering being based at least in part on the aggregated execution bandwidth allocation requested.

2. The method of claim 1, wherein each execution bandwidth allocation request is expressed in terms of a percentage of a processing power of the processor while operating at full throttle.

3. The method of claim 1, wherein each execution bandwidth allocation request is expressed in terms of absolute processing power.

4. The method of claim 1, wherein the altering comprises scaling at least a selected one of ii) a clock frequency of a clock signal or (ii) a voltage supplied to the processor.

5. The method of claim 4, wherein the altering comprises scaling both (i) the clock frequency of a clock signal and (ii) the voltage supplied to the processor.

6. The method of claim 4, wherein the scaling is based at least in part on a result of the aggregating.

7. The method of claim 6, wherein the aggregating and the scaling are performed in real time, after the execution bandwidth allocation request of a first instruction execution thread of the plurality of instruction execution threads has been modified, and the method further comprises modifying the execution bandwidth allocation request of the first instruction execution thread.

8. The method of claim 7, wherein the modifying is performed in response to a change in a volume of data to be processed by the first instruction execution thread.

9. The method of claim 7, wherein the modifying is performed in response to an interrupt, and the first instruction execution thread comprises a handler of the interrupt.

10. The method of claim 7, wherein the modifying is performed in response to an external event.

11. The method of claim 6, wherein the plurality of instruction execution threads comprise a newly activated or re-activated instruction execution thread, and the aggregating and the scaling are performed in real time, after activation or re-activation of the newly activated or re-activated instruction execution thread.

12. The method of claim 11, wherein the newly activated or re-activated execution thread is configured to perform intensive computations.

13. An apparatus comprising:
an execution block to execute a plurality of instruction execution threads;
a clock to supply a clock signal to the execution block;
a voltage supply to supply a voltage to the execution block;
a regulator to scale at least a selected one of (i) a clock frequency of the clock signal or (ii) the voltage supplied to the execution block; and
a scheduler configured to
receive, for each of the plurality of instruction execution threads, a corresponding execution bandwidth allocation request that is associated with an execution bandwidth allocation requested by the corresponding instruction execution thread,
aggregate execution bandwidth allocation requests of the plurality of instruction execution threads, and
configure the regulator to perform the scaling based at least in part on the aggregated bandwidth allocation requests of the instruction execution threads.

14. The apparatus of claim 13, wherein at least one of the execution bandwidth allocation requests is expressed relatively in terms of a percentage of a processing power of the processor while operating at full throttle.

15. The apparatus of claim 13, wherein both the clock and the regulator are coupled to the voltage supply, with the clock coupled to the regulator through the voltage supply, and the regulator is configured to scale both tithe clock frequency of the clock signal and (ii) the voltage supplied to the execution block.

16. The apparatus of claim 13, wherein at least the processor and the regulator are co-located on an integrated circuit.

17. The apparatus of claim 13, wherein the scheduler is configured to perform the aggregating and the configuring of the regulator in real time, after receiving a modification to the execution bandwidth allocation request of a first instruction thread of the plurality of instruction execution threads.

18. The apparatus of claim 17, wherein the modification is received in response to a change in a volume of data to be processed by first instruction execution thread.

19. The apparatus of claim 17, wherein the modification is received in response to an interrupt, and the first instruction execution thread comprises a handler of the interrupt.

20. The apparatus of claim 17, wherein the modification is received in response to an external event.

21. The apparatus of claim 17, wherein the apparatus is a storage system.

22. The apparatus of claim 13, wherein the plurality of instruction execution threads comprise a newly activated or re-activated instruction execution thread, and the controller is configured to perform the aggregating and the configuring in real time, after activation or re-activation of the newly activated or re-activated instruction execution thread.

23. The apparatus of claim 22, wherein the newly activated or re-activated execution thread is configured to perform intensive computations.

24. The apparatus of claim 13, wherein the apparatus is a wireless communication device.

25. The apparatus of claim 13, wherein at least one of the execution bandwidth allocation requests is expressed in terms of absolute processing power.

26. An apparatus comprising:
execution means for executing instruction execution threads;
means coupled to the execution means to (i) receive, for each instruction execution thread, a corresponding execution bandwidth allocation request that is associated with an execution bandwidth allocation requested by the corresponding instruction execution thread, and (ii) aggregate execution bandwidth allocation requests of the instruction execution threads; and
means coupled to the execution means to alter one or more operating characteristics of the execution means to throttle the execution means, to enable the execution means to either provide more execution bandwidth or reduce power consumption, with the alteration being based at least in part on aggregated execution bandwidth allocation requests of the instruction execution threads.

27. The apparatus of claim 26, wherein the apparatus further comprises clock means coupled to the execution means to supply a clock signal to the execution means, and voltage supply means coupled to the execution means to supply a voltage to the execution means; and the means to alter comprises regulation means coupled to at least a selected one of the clock means or the voltage supply means to scale clock frequency of a clock signal or voltage supplied to the execution means, and scheduling means coupled to the regulation means to configure the regulation means to perform the scaling based at least in part on the aggregated bandwidth allocation requests.

* * * * *